(12) United States Patent
O'Neal et al.

(10) Patent No.: US 6,215,656 B1
(45) Date of Patent: Apr. 10, 2001

(54) METHOD AND APPARATUS FOR FACTORY OR USER CONFIGURABLE EXTERNAL CONNECTORS

(75) Inventors: Sean P. O'Neal, Round Rock; Reynold L. Liao; Mark A. White, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/335,587

(22) Filed: Jun. 18, 1999

(51) Int. Cl.[7] .............................. H05K 5/02; H05K 5/00
(52) U.S. Cl. ...................... 361/686; 361/683; 361/748; 364/208.1
(58) Field of Search ................................. 361/686, 683, 361/685, 727, 736, 737, 748, 752, 753; 364/708.1

(56) References Cited

U.S. PATENT DOCUMENTS

| | | | |
|---|---|---|---|
| 5,185,881 | * 2/1993 | Brooks et al. | 395/575 |
| 5,251,302 | * 10/1993 | Weigi et al. | 395/250 |
| 5,572,688 | * 11/1996 | Sytwu | 395/309 |
| 5,576,935 | * 11/1996 | Freer et al. | 361/785 |
| 5,664,950 | * 9/1997 | Lawrence | 439/76.1 |
| 5,666,267 | * 9/1997 | Carter et al. | 361/686 |
| 5,706,179 | * 1/1998 | Palatov | 361/788 |
| 5,748,443 | * 5/1998 | Flint et al. | 361/686 |
| 5,754,796 | * 5/1998 | Wang et al. | 395/281 |
| 5,841,993 | * 11/1998 | Ho | 395/282 |
| 5,905,885 | * 5/1999 | Richter et al. | 395/500 |
| 5,956,521 | * 9/1999 | Wang | 395/855 |
| 6,006,295 | * 12/1999 | Jones et al. | 710/62 |

* cited by examiner

*Primary Examiner*—Leo P. Picard
*Assistant Examiner*—Anatoly Vortman
(74) *Attorney, Agent, or Firm*—Skjerven Morrill MacPherson LLP; Stephen A. Terrile; Mary Jo Bertani

(57) ABSTRACT

An apparatus and method is provided for installing and connecting one or more expansion boards in a computer system while the computer system is being manufactured as well as when a user upgrades or reconfigures the computer system. An expansion board bay for receiving the expansion board is located within the computer system, typically on a circuit board such as the motherboard. A connector module that is separate from the expansion board and the expansion board bay is positioned within the computer system. The connector module is positioned to provide easy external access to a contact portion of the connector module, thereby allowing a user to connect an external data signal line to the connector module. A connector cable operably connects the expansion board with the connector module to establish communication between the data processor and the external data line through the expansion board.

15 Claims, 3 Drawing Sheets

METHOD AND APPARATUS FOR FACTORY OR USER CONFIGURABLE EXTERNAL CONNECTORS

BACKGROUND OF THE INVENTION

1. Field of the Invention

This invention relates to the field of connecting modular devices in a computer, and more particularly, to a method and apparatus for providing generic connector bays, and connector cables and modules that are capable of receiving a variety of hardware modules within the interior portion of a personal computer.

2. Description of the Related Art

Plug-in expansion boards enable manufacturers of computer systems and users to expand the capabilities of their computer systems as desired on a modular basis. An expansion board is a printed circuit card that slides into one of the expansion slots provided in the housing of a computer system. Expansion boards are often further distinguished by the standard followed by their interface or the connector at the bottom of the board. For example, an ISA expansion board follows the Industry Standard Architecture bus standard and a PCI expansion board follows the Peripheral Component Interconnect standard.

Typical expansion boards that may be placed within a computer include additional microprocessors, additional memory, fax/modem capability, network interface, television tuners, sound cards, global positioning system (GPS) receivers, and graphics cards. In portable computers, hardware components such as these are packaged in portable computer memory card international association ("PCMCIA") cards and miniature peripheral component interface (mini-PCI) cards, both of which are small expansion modules each roughly the size and shape of a credit card. These cards allow the user to expand the processing or interfacing capabilities of a portable computer with the insertion of a single card into the computer and interfacing it with the motherboard or other circuit board, in the computer. PCMCIA cards have connectors built into them whereas mini-PCI cards do not. For this reason, PCMCIA cards are more expensive and computer system manufacturers are migrating toward using mini-PCI cards instead of PCMCIA cards. It is therefore desirable to have an adaptable system of connectors and cables that may be used with a variety of miniPCI cards.

The expansion boards may be either installed during assembly of the computer system at the manufacturer, or a user may install one or more expansion boards at a later time. The circuit board interface may be designed to accommodate all the expansion boards to be included when they are installed during manufacture, however, a problem arises when a user wants to add a new expansion board that was not anticipated during manufacture, and there is not enough room on the circuit board to accommodate the expansion board.

In the prior art, an expansion board in the form of an expansion module is often insertable through an exterior housing side wall slot of the computer into an interior housing card chamber within which a PCMCIA frame or connector having an ejector mechanism associated therewith is positioned. The inner end of the inserted card is forcibly plugged into and electrically connected with a complementary pin connector portion of a PCMCIA connector that is in turn, directly and permanently electrically connected to the computer system motherboard. Alternatively, the expansion modules may be installed entirely within the interior of the computer and attached directly to the motherboard.

Many types of expansion boards have a built-in connector that is accessible by the user to connect an external data signal line. Examples include RJ11 connector to connect a modem card to a telephone line, an RJ45 connector to connect a network card to a network link, and an antenna or cable connector to connect a TV tuner card. A further problem may therefore arise when a user attempts to add an expansion board requiring an external connector, and the expansion board does not fit on the motherboard or cannot be positioned so that the connector is readily accessible to the user.

It is therefore desirable to provide a computer system capable of being upgraded with a new or additional expansion boards regardless of prior configurations, and to have access to any required external connector ports on the expansion boards installed in the computer system.

SUMMARY OF THE INVENTION

The present invention provides an apparatus and method for installing and connecting one or more expansion boards in a computer system while the computer system is being manufactured as well as when a user upgrades or reconfigures the computer system. An expansion board bay for receiving the expansion board is located within the computer system, typically on a circuit board such as the motherboard. A connector module that is separate from the expansion board and the expansion board bay is positioned within the computer system. The connector module is positioned to provide easy external access to a contact portion of the connector module, thereby allowing a user to connect an external data signal line to the connector module. A connector cable operably connects the expansion board with the connector module to establish communication between the data processor and the external data line through the expansion board.

The cable is connected between the connector module and the expansion board in one of several alternate ways. One aspect of the structure for connecting the connector module and the expansion board together using a cable is that enough space is provided to allow use of the largest foreseeable number of contacts that connector modules and expansion boards may require for communication. This feature provides a user with a wide range of flexibility with regard to the type of expansion board and connector module that may be installed.

In one embodiment, the cable and connector module are soldered together to establish contact between electrical contacts in the connector module and electrical wires in the cable.

In another embodiment, the cable and the connector module are coupled by mating a first contact portion, such as one or more pins, on the connector module with a corresponding second contact portion, such as one or more sockets, on one end of the cable.

In another embodiment, the connector module includes a first contact portion that mates with one portion of a jumper block and the cable includes a second contact portion that mates with another portion of the jumper block. The contact portions may be a pin and socket arrangement such as sockets in the jumper block corresponding to pins on a connector at one end of the cable and in the bottom of the connector module.

The foregoing has outlined rather broadly the features and technical advantages of the present invention so that those skilled in the art may better understand the detailed description of the invention that follows.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
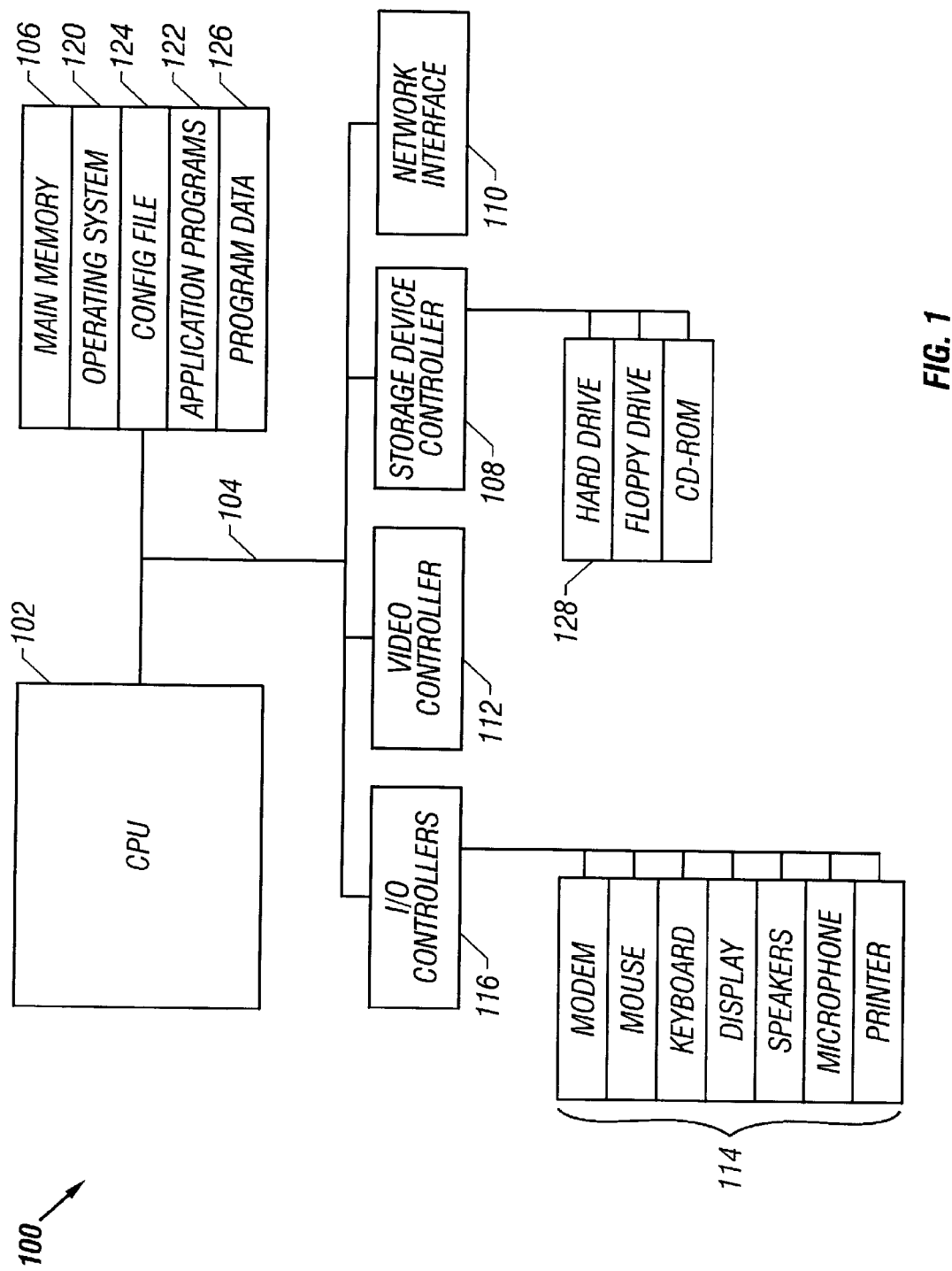
FIG. 1 illustrates a diagram of a computer system in which the present invention is used.

Referring to FIG. 1, computer system 100 includes a central processing unit (CPU) 102 connected by system bus 104 to various components including main controller 105, main memory 106, storage device controller 108, network interface 110, video controller 112, and input/output devices 114 connected via input/output (I/O) controllers 116. Those skilled in the art will appreciate that this system encompasses all types of computer systems: personal computers, midrange computers, mainframes, etc. Note that many additions, modifications, and deletions can be made to this computer system 100 when used as a component of the present invention. Examples of I/O devices that may be connected to system bus 104 for inputting and outputting data include a modem, mouse, keyboard, display monitor, speakers, and microphone. Computer system 100 may be one of many workstations connected to a network such as a local area network (LAN), a wide area network (WAN), or a global information network such as the Internet through network interface 110.

CPU 102 can be constructed from one or more microprocessors and/or integrated circuits. Main memory 106 stores programs and data that CPU 102 may access. When computer system 100 starts up, operating system 120 is loaded into main memory 106. Operating system 120 is a program that manages the resources of computer system 100, such as CPU 102, memory controller 105, storage device controller 108, network interface 110, I/O controllers 116, and system bus 104. The operating system 120 reads one or more configuration files 124 to determine the hardware and software resources connected to computer system 100.

During operation, main memory 106 includes operating system 140, configuration file 124, and one or more application programs 122 with related program data 126. Application programs 122 can run with program data as input, and output their results as program data 126 in main memory 106 or to one or more mass storage devices 128 through memory controller 105 and storage device controller 108. CPU 102 executes many application programs 122, including one or more programs to establish a connection to a computer network through network interface 110. The application program 122 may be embodied in one executable module or it may be a collection of routines that are executed as required.

Storage device controller 108 allows computer system 100 to retrieve and store data from mass storage devices 128 such as magnetic disks (hard disks, diskettes), digital video disks (DVD), and optical disks (CD-ROM). The mass storage devices 128 are commonly known as Direct Access Storage Devices (DASD), and act as a permanent store of information. The information from the DASD can be in many forms including application programs and program data. Data retrieved through storage device controller 108 is usually placed in main memory 106 where CPU 102 can process it.

System bus 104 allows data to be transferred among the various components of computer system 100. Although computer system 100 is shown to contain only a single main CPU 102 and a single system bus 104, those skilled in the art will appreciate that the present invention may be practiced using a computer system that has multiple CPUs 102 and/or multiple busses 104. One such bus is an expansion bus that establishes a line of communication between an expansion bus slot (which is typically on the motherboard) and CPU 102. A wide range of expansion boards (not shown) are available to plug into expansion bus slots (not shown) to increase the capability of computer system 100. In addition, the interfaces that are used in the preferred embodiment may include separate, fully programmed microprocessors that are used to off-load computationally intensive processing from CPU 102, or may include input/output (I/O) adapters to perform similar functions.

Figure 2:
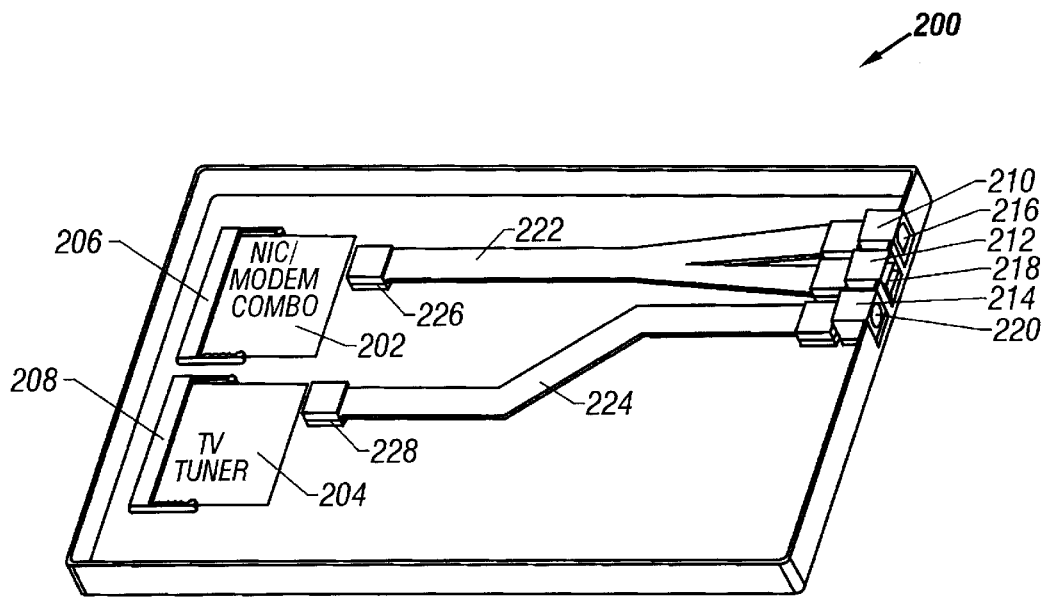
FIG. 2 is a perspective view of an example of a circuit board with connector modules and expansion board bays connected by cables according to the present invention.

FIG. 2 shows an embodiment of the present invention for installing and connecting expansion boards on circuit board 200. Note that FIG. 2 shows mini-PCI type cards as examples of expansion boards that are suitable for use with the present invention, however, other types of expansion cards and boards may also be utilized instead of or in addition to mini-PCI cards. Circuit board 200 is typically mounted in a housing (not shown) associated with computer system 100 and other components (not shown in FIG. 2) are also typically mounted on circuit board 200. For example, circuit board 200 may be the motherboard of computer system 100 and include system components such as CPU 102, main memory 106 and memory controllers, support circuitry including I/O controllers 116, video controller 112, and storage device controller 108, and expansion slots for adding one or more expansion boards 202 and 204 to expand computer system's 100 functional capabilities. Additionally, the present invention is not limited to use with two expansion boards 202 and 204, but may be implemented with as many expansion boards as required.

Circuit board 200 may be another suitable circuit board included in computer system 100 instead of or in addition to the motherboard. Further, when circuit board 200 is too small to hold all the desired components and expansion boards, one or more expansion boards may be retained in a structure that is not attached to circuit board 200. In such an embodiment, expansion boards may be retained in a suitable structure proximate circuit board 200 and connected for electrical communication with other components on computer system's 100 motherboard using cables and connectors as known in the art.

Expansion board bays 206, 208 are positioned at convenient locations, such as on circuit board 200, during the layout and design of computer system 100. Expansion boards 202 and 204 include electrical contacts (not shown) that mate with contacts in expansion board bays 206, 208 when expansion boards 202 and 204 are inserted. A variety of such contacts are well known in the art including single edge contacts, and pin and socket connectors. In order to provide a physical connection for establishing electrical communication between CPU 102 and expansion boards 202 and 204 via bus 104, there are also electrical contacts (not shown) between circuit board 200 and expansion board bays 206 and 208.

Figure 3:
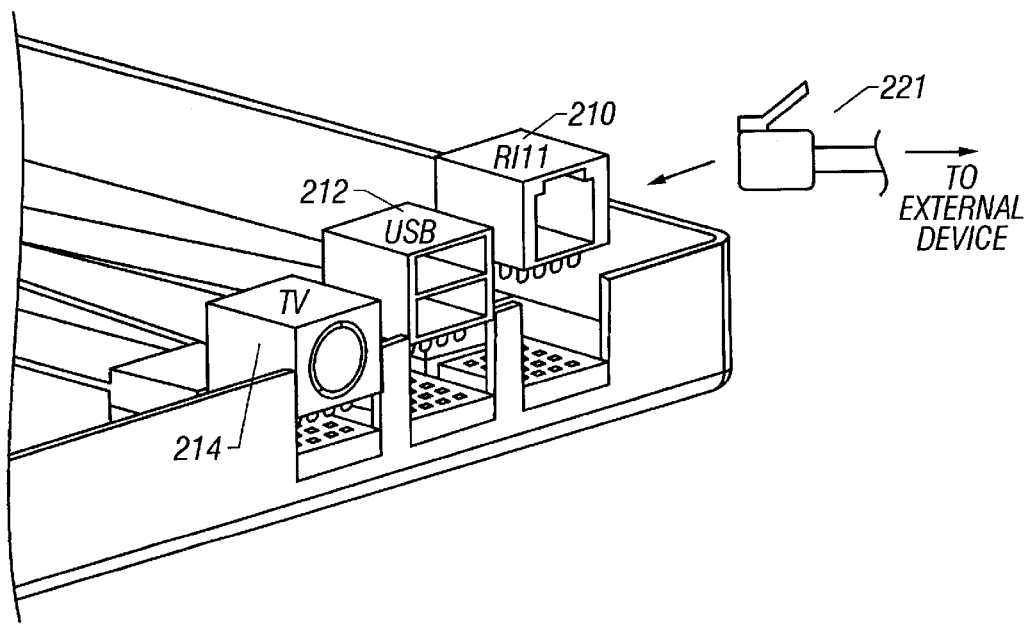
FIG. 3 is a perspective view of a close-up of example of connector modules.

In the present invention, connector modules 210, 212, and 214 are separate from expansion boards 202 and 204 and are positioned independently on or near circuit board 200. Connector modules 210, 212, and 214 may be positioned at any desired location and may include contact portion 216, 218, and 220, respectively, that are positioned to allow a user to attach a data signal line 221 to connector modules 210, 212, and 214 to provide the physical connection for establishing communication with a device external to computer system 100. Connector modules 210, 212, and 214 shown in FIGS. 2 and 3 are examples of various connector modules that may be included. Connector module 210 is an RJ 11 connector used to connect a standard telephone line to a dial-up modem. Connector module 212 is an universal serial bus (USB) connector used for a network interface connection card. Connector module 214 is shown as a TV antenna connector. A manufacturer or user selects the connector modules to install based on the type of expansion boards 202 and 204 to be installed in computer system 100. In the embodiment shown in FIG. 2, connector modules 210 and 212 are used in conjunction with modem/network interface card (NIC) 202, while connector module 214 is used with TV tuner card 204.

In the prior art, the connector modules are built-in to the expansion board, thereby limiting the location and orientation of the expansion board inside computer system 100. By separating the connector module from the expansion board, the present invention advantageously allows expansion boards 202 and 204 to be located and oriented as desired, providing greater flexibility in system design and capabilities.

Figure 4A:
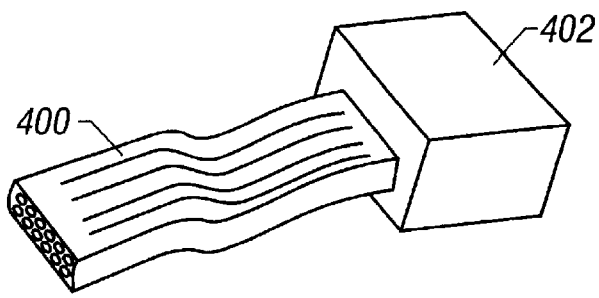
FIG. 4A is a perspective view of one example of connector structure for connecting the cable and a connector module.
Figure 4B:
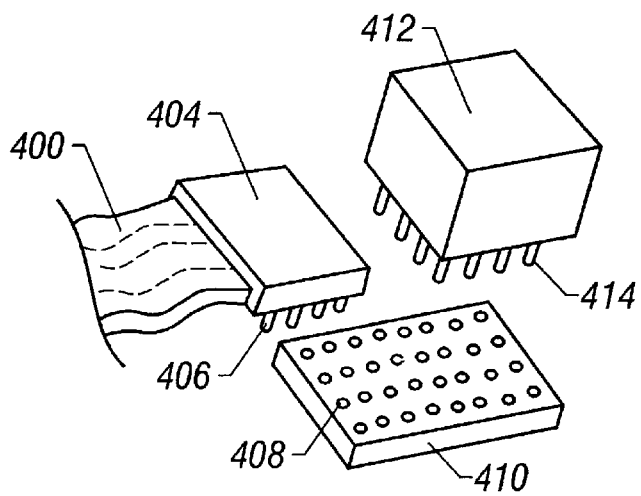
FIG. 4B is a perspective view of another example of connector structure for connecting the cable and a connector module.
Figure 4C:
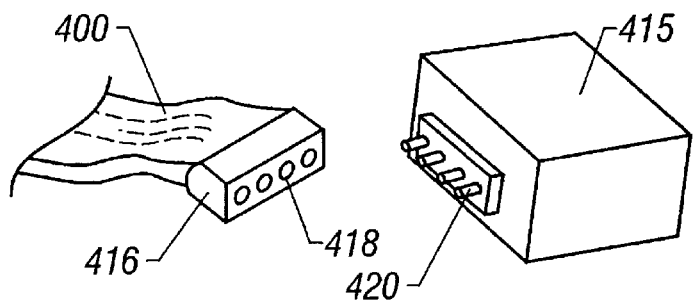
FIG. 4C is a perspective view of another example of connector structure for connecting the cable and a connector module.

Connector cables 222 and 224 operably connect expansion boards 202 and 204 to connector modules 210, 212, and 214. Each connector module 210, 212, and 214 includes an electrical contact portion that corresponds to and mates with an electrical contact portion on one end of the cable. A variety of such contacts are well known in the art including, for example, single edge contacts, and pin and socket connectors. FIGS. 4A through 4C show examples of embodiments of contacts that may be utilized with the present invention.

FIG. 4A shows one end of cable 400 inserted in connector module 402. Cable 400 includes several strands of wire encased in non-conductive coating to isolate electrical signals in the wires from one another. Each wire is attached to a corresponding contact in connector module 402 using suitable attachment means such as soldering wires to the contacts, or pressing the cable through a series of overlapping contacts with sharp edges that slice the non-conductive coating to contact the wire in the cable as the cable is pressed onto the contacts. Other attachment means known in the art may also be utilized.

FIG. 4B shows cable 400 with pin connector portion 404 attached to one end. Pin connector portion 404 includes a series of pins 406 that mate with and form electrical contacts with corresponding sockets 408 in one portion of jumper board 410. Connector module 412 also includes a series of pins 414 that mate with and form electrical contacts with corresponding sockets 408 in another portion of jumper board 410. Jumper board 410 also includes connections (not shown) that connect sockets 408 in the one portion of jumper board 410 to the corresponding sockets 408 in the other portion of jumper board 410 to provide the physical structure for establishing communication between connector module 412 and cable 400 when a data signal line is plugged into connector module 412.

FIG. 4C shows another embodiment of means for connecting cable 400 to connector module 415 wherein connector portion 416 includes a series of sockets 418 that correspond to a series of pins 420 on connector module 415.

It is important to note that the embodiments shown in FIGS. 4A through 4C are examples of various ways to connect cable 400. The number of pins and sockets, and the number of wires in cable 400 will vary according the number of data signals that are communicated by the external data line 221 (FIG. 2). The present invention provides a structure that allows a manufacturer or user to change the connector module and cable 400 to provide the desired physical interface for connecting any corresponding extend data signal line. For example, a user may receive computer system 100 with a selection of connector modules pre-installed, and later change one or more of the connector modules and corresponding cable 400 and expansion boards 202, 204 to provide the desired capability in his or her computer system 100.

Referring back to FIG. 2, the other end of cables 222 and 224 are connected to expansion boards 202 and 204. There are several known structures that may be utilized to establish electrical communication between cables 222 and 224 and expansion boards 202 and 204, including a pin and socket connector similar to those shown in FIGS. 4B and 4C. Other known connector/cable combinations may be utilized with the present invention, including zero insertion force (ZIF) connectors and flexible printed circuit (FPC) cables, pin and socket connectors and discrete wire cables, and pin and socket connectors and ribbon cable. When expansion boards 202 and 204 include a built-in connector module, an adapter between connector pad 226 and 228 may be used to connect expansion boards 202 and 204 to cables 222 and 224.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A computer system comprising:
    an expansion board bay for receiving an expansion board;
    a system processor;
    a communication bus operably connected between the system processor and the expansion board bay;
    a connector module positionable independently of the expansion board, wherein the connector module includes a contact portion that is positioned to allow a user to attach an external data signal line between the contact portion and a device external to the computer system; and
    a connector cable for operably connecting the expansion board and the connector module.

2. The computer system, as set forth in claim 1, further including a circuit board, wherein the expansion board bay is positioned on the circuit board.

3. The computer system, as set forth in claim 1, further including a circuit board, wherein the connector module is positioned on the circuit board.

4. The computer system, as set forth in claim 1, further comprising one end of the connector cable being connected to the connector module, and another end of the connector cable being connected to the expansion board bay.

5. The computer system, as set forth in claim 1, further comprising a first contact portion on the connector module and a corresponding second contact portion on one end of the cable.

6. The computer system, as set forth in claim 1, further comprising a jumper block, wherein the connector module includes a first contact portion that mates with one portion of the jumper block and the cable includes a second contact portion that mates with another portion of the jumper block.

7. An apparatus for connecting an expansion board in a computer system, the apparatus comprising:

an expansion board bay for receiving the expansion board, the expansion board bay being positioned on a circuit board;

a connector module positionable independently of the expansion board and the expansion board bay, wherein the connector module includes a contact portion that is positioned to allow a user to attach an external data signal line between the contact portion and a device external to the computer system; and a connector cable for operably connecting the expansion board and the connector module when the expansion board is installed in the expansion board bay.

8. The apparatus, as set forth in claim 7, wherein the connector module is positioned on the circuit board.

9. The apparatus, as set forth in claim 7, further comprising one end of the connector cable being connected for communication with the connector module, and another end of the connector cable being connected for communication with the expansion board.

10. The apparatus, as set forth in claim 7, further comprising a first contact portion on the connector module and a corresponding second contact portion on one end of the cable.

11. The apparatus, as set forth in claim 7, further comprising a jumper block, wherein the connector module includes a first contact portion that mates with one portion of the jumper block and the cable includes a second contact portion that mates with another portion of the jumper block.

12. A method for installing an expansion board in a computer system, the computer system having a data processor, the method comprising:

attaching an expansion board bay on a circuit board in the computer system;

installing an expansion board in the expansion board bay;

connecting a computer bus in electrical communication with the data processor and the expansion board;

positioning a connector module within the computer system, the connector module being positionable independently of the expansion board, wherein the connector module includes a contact portion that is positioned to allow a user to attach an external data signal line between the contact portion and a device external to the computer system; and connecting a cable to operatively connect the expansion board and the connector module.

13. The method, as set forth in claim 12, wherein the connector module is positioned on the circuit board.

14. The method, as set forth in claim 12, further comprising providing a first contact portion on the connector module and a corresponding second contact portion on one end of the cable.

15. The method, as set forth in claim 12, further comprising providing a jumper block on the circuit board, wherein the connector module includes a first contact portion that mates with one portion of the jumper block and the cable includes a second contact portion that mates with another portion of the jumper block.

* * * * *